3,476,837
ALKALI METAL SALTS OF PHOSPHORUS
DITHIOCARBAMATES
Roger Williams Addor, Pennington, N.J., assignor to
American Cyanamid Company, Stamford, Conn.,
a corporation of Maine
No Drawing. Filed Mar. 1, 1967, Ser. No. 619,606
Int. Cl. C07f 9/24, 9/36; A01n 9/36
U.S. Cl. 260—959          8 Claims

ABSTRACT OF THE DISCLOSURE

This invention relate to novel phosphinyl- and phosphinothioyldithiocarbamates and to methods for their preparation. More particularly, it relates to novel compounds of the formula:

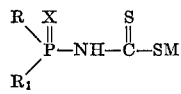

wherein R and R₁ are each (lower)alkyl, (lower)alkoxy or phenyl; X is an oxygen or sulfur atom; and M is an alkali metal, such as sodium, potassium or lithium, said compounds having utility as intermediates in the synthesis of phosphorus compounds exhibiting insecticidal activity.

BACKGROUND OF THE INVENTION

The protection of agronomic crops against insect attack and the control of insect population are troublesome problems. To combat the problems created by insect pests, a myriad of useful and effective insecticidal compositions have recently been developed. Among the more effective are those which contain phosphorus compounds. Illustrative of the latter are disclosed in U.S. Letters Patents Nos. 3,197,481 and 3,281,430. However, although these patents describe procedures for synthesizing such phosphorus compounds, improved methods for their preparation are actively being pursued. It would, therefore, be highly desirable to provide, for instance, novel intermediate compounds and economical methods which permit those skilled in the art to synthesize insecticidally active phoshorus compounds.

SUMMARY

In general, the compounds of the invention can be prepared in a straightforward manner by reacting a suitable alkali metal hydrosulfide in the presence or absence of an insert solvent, such as methanol, with a phosphinyl- or phospino-thioyl isothiocyanate in accordance with the reaction graphically written as follows:

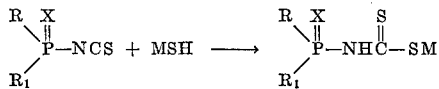

wherein R, R₁, M and X are each defined as hereinabove. Resultant product can be isolated either as a precipitated solid or, if in solution, by the removal of solvent. For many purposes, it is not necessary, nor even desirable, to isolate the produce from the medium in which it is made. For instance, where the reaction medium is inert with respect to further processing operations, isolation of the product is not required, as in the preparation of 2 - dialkoxyphosphinylimino - 1,3 - dithiolanes obtained by directly reacting a newly formed sodium dialkoxyphosphinyldithiocarbamate with ethylene bromide and sodium bicarbonate.

Exemplary isothiocyanates employed as reactants in the process of the invention are: Dimethoxyphosphinyl isothiocyanate, dimethoxyphosphinothioyl isothiocyanate, diethoxyphosphinothioyl isothiocyanate, dipropoxyphosphinyl isothiocyanate, dibutoxyphosphinothioyl isothiocyanate, diethylphosphinyl isothiocyanate, diphenylphosphinothioyl isothiocyanate, and ethoxyphenylphosphinothioyl isothiocyanate.

In general, the isothiocyanate reactant herein may, for example, be prepared by the reaction of a phosphinyl- or phophinothioyl halide with ammonium thiocyanate as disclosed in "Methoden Der Organishen Chemie," Vol. 12/2, pages 587–588 and 795–796, inclusive.

Illustrative hydrosulfides which can be used in the process of the invention are: potassium hydrosulfide, sodium hydrosulfide, and lithium hydrosulfide. The appropriate hydrosulfide can be generated from the corresponding hydroxide or alkoxide in situ by saturating the metal hydroxide or alkoxide solution with hydrogen sulfide. Where the hydrosulfide is to be generated in situ, solvents such as methanol, ethanol, t-butanol or dimethylformamide are preferably utilized. However, suspensions of metal hydrosulfides in solvents, such a ethylene glycol dimethylether, benzene or chloroform may also be employed.

The compounds of the invention possess utility as intermediates in the synthesis of phosphorus compounds exhibiting insecticidal activity. For instance, the reaction of potassium diethoxyphosphinyldithiocarbamate with an alkylene halide, such as ethylene bromide or trimethylene bromide, and sodium bicarbonate yields 2-diethoxyphosphinylimino-1,3-dithiolane and 2-diethoxyphosphinylimino-1,3-dithiane, respectively. These compounds are highly effective contact insecticides and will control aphids when applied thereto even at concentrations as low as 0.001%. Further, when the latter are applied to soil containing root-knot nematodes at five pounds per acre or more, 100% control of the nematodes is achieved.

Illustrative compounds prepared by the process of the present invention are: Potassium diethoxyphosphinyldithiocarbamate, potassium diisophopoxyphosphinyldithiocarbamate, potassium diethoxyphosphinothioyldithiocarbamate, sodium diethylphosphinyldithiocarbamate, sodium diethylphosphinothioyldithiocarbamate, sodium ethoxyphenylphosphinothioyldithiocarbamate, and potassium ethoxyethylphosphinyldithiocarbamate.

The following example are presented to illustrate the invention. They are deemed to be taken as illustrative and are not limitative. Unless otherwise stated, the parts given are by weight.

Example 1.—Preparation of potassium diethoxyphosphinyldithiocarbamate

To a mixture of 57.6 grams (0.512 mole) of potassium t-butoxide in 650 ml. of t-butanol saturated with hydrogen sulfide is added 100 gram (0.512 mole) of diethoxyphosphinyl isothiocyanate in 50 ml. of t-butanol over a one hour period. The reaction is mildly exothermic and maintained at about 25° C.–30° C. with a water bath. After another hour, the reaction solids are collected and washed twice with t-butanol/benzene (10:1), then twice with benzene, and finally twice with ether. After vacuum drying overnight, the recovered fluorescent light-yellow powdery salt which weighs 122.7 grams (89%) has a melting point of 97° C.–99° C. (dec.).

Analysis.—Calcd. for $C_5H_{11}NO_3PS_2K$(percent): Calcd: C, 22.46; H, 4.15; N, 5.24; P. 11.59; S, 23.99. Found percent: C, 21.67; H, 4.29; N, 4.95; P, 11.28; S, 24.46.

Example 2.—Preparation of potassium diisopropoxyphosphinyldithiocarbamate

Addition of 50.0 grams (0.225 mole) of diisopropoxyphosphinyl isothiocyanate to a mixture of 25.2 grams (0.225 mole) of potassium t-butoxide in 300 ml. of t-butanol saturated with hydrogen sulfide yields a clear light yellow solution. The mixture is stripped in vacuo adding several portions of benzene to improve removal of butanol. The remaining yellow solids amount to 66.3 grams, whose melting point is 105° C.–107° C. (dec.). The infrared spectrum shows strong new bands at 895, 1218, 1425, and 3100 cm.$^{-1}$, approximately in common with the analogous diethyl analog.

Example 3

Substituting ethoxyethylphosphinyl isothiocyanate or methylethylphosphinyl isothiocyanate for diisopropoxyphosphinyl isothiocyanate in Example 2 above, there is obtained in good yield potassium ethoxyethylphosphinyldithiocarbamate and potassium methylethylphosphinyldithiocarbamate, respectively.

Example 4.—Preparation of potassium diethoxyphosphinothioyldithiocarbamate

To a suitable reaction vessel containing a suspension of potassium hydrosulfide (obtained from 5.3 grams (0.047 mole) of potassium t-butoxide and excess hydrogen sulfide) in 50 milliliters of t-butanol are added 10.0 grams (0.047 mole) of diethoxyphosphinothioyl isothiocyanate in 20 ml. of t-butanol. Resultant reaction is mildy exothermic and results in a clear yellow solution. After diluting the latter solution with benzene and concentrating in vacuo with mild heating, the residue is further dried in a vacuum dessicator over potassium hydroxide to yield 11.9 grams (89%) of a yellow solid. In a capillary, softening occurs at 77° C. and bubbling and melting from 79° C.–90° C. to yield an unclear melt. The infrared spectrum shows a strong band at 3050 cm.$^{-1}$ (NH) in addition to other new strong bands at 882, 1210, and 1410 cm.$^{-1}$ comparable to bands found in the P=O analog. A weak band at 2050 cm.$^{-1}$ indicates the presence of traces of thiocyanate ion.

Example 5.—Preparation of sodium diethylphosphinyldithiocarbamate

To mixture of 10.0 grams of sodium t-butoxide in 100 ml. of t-butanol saturated with hydrogen sulfide is added 17.0 grams of diethylphosphinyl isothiocyanate. The reaction mixture is stirred on a water bath for an hour and the crude product collected and washed successively with t-butanol/benzene mixture and with ether. After drying under vacuum, the above-identified product is collected.

Example 6.—Preparation of sodium ethoxyphenylphosphinothioyldithiocarbamate

Twenty grams of ethylphenylphosphinothioyl isothiocyanate in 50 ml. of t-butanol are added to a mixture of 8.0 grams of sodium t-butoxide and hydrogen sulfide in t-butanol. The mixture is stirred, benzene is added, and the mixture subjected to mild heating to concentrate the residue. After drying under vacuum, sodium ethoxyphenylphosphinothioyldithiocarbamate is recovered.

Example 7.—Preparation of 2-diethoxyphosphinylimino-1,3-dithiolane

A mixture of 1.50 grams (0.0056 mole) of potassium diethoxyphosphinyldithiocarbamate as prepared in Example 1 above, 0.5 ml. (0.0058 mole) of ethylene bromide, and 0.58 gram (0.0069 mole) of sodium bicarbonate in 20 ml. of methanol is stirred vigorously overnight. After addition of ether (ca. an equal volume), the mixture is filtered and concentrated in vacuo. The residue is remixed with benzene and the mixture is filtered and concentrated to yield 1.30 grams of yellow oil. The oil is redissolved in benzene and washed with dilute salt solution three times. The dried organic mixture, on concentration, yields 0.96 grams (67%) of crude 2-diethoxyphosphinylimino-1,3-dithiolane identified by comparison of its infrared spectrum with the known compound.

I claim:

1. A compound of the formula:

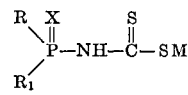

wherein R and $R_1$ are each selected from the group consisting of (lower)alkyl, (lower)alkoxy, phenyl; X is selected from the group consisting of sulfur and oxygen; and M is an alkali metal.

2. The compound according to claim 1 wherein R and $R_1$ are (lower)alkyl and X is sulfur.

3. The compound according to claim 1 wherein R and $R_1$ are (lower)alkyl and X is oxygen.

4. The compound according to claim 1 wherein R is (lower)alkoxy, $R_1$ is phenyl, and X is sulfur.

5. The compound according to claim 1 wherein R and $R_1$ are (lower)alkoxy and X is sulfur.

6. The compound according to claim 1 wherein R and $R_1$ are (lower)alkoxy and X is oxygen.

7. The compound according to claim 1 wherein R is (lower)alkyl, $R_1$ is (lower)alkoxy, and X is sulfur.

8. The compound according to claim 1 wherein R is (lower)alkyl, $R_1$ is (lower)alkoxy, and X is oxygen.

References Cited

UNITED STATES PATENTS 3,136,801    6/1964    Hopkins.

OTHER REFERENCES

Otto et al.: "J. Am. Chem. Soc.," vol. 80 (1958), pp. 5894–5.

Kharash.: "Organic Sulfur Compounds," vol. I (1961), p. 333.

CHARLES B. PARKER, Primary Examiner

A. H. SUTTO, Assistant Examiner

U.S. Cl. X.R.

252—301.2; 260—551, 938, 947, 968, 999